US007604539B2

(12) United States Patent
Hartl et al.

(10) Patent No.: US 7,604,539 B2
(45) Date of Patent: Oct. 20, 2009

(54) GAMING DEVICE HAVING A PUZZLE FUNCTION OPERABLE TO INDICATE INFORMATION RELATED TO A GAME EVENT

(75) Inventors: Josef Alexander Hartl, Henderson, NV (US); R. Brooke Dunn, Henderson, NV (US); Michael C. Halvorson, Las Vegas, NV (US); Mark A. Litman, Edina, MN (US)

(73) Assignee: IGT, Reno, NV (US)

( * ) Notice: Subject to any disclaimer, the term of this patent is extended or adjusted under 35 U.S.C. 154(b) by 302 days.

(21) Appl. No.: 11/220,470

(22) Filed: Sep. 7, 2005

(65) Prior Publication Data

US 2006/0003827 A1 Jan. 5, 2006

Related U.S. Application Data

(62) Division of application No. 10/244,054, filed on Sep. 12, 2002, now Pat. No. 6,960,134.

(51) Int. Cl.
*A63F 9/24* (2006.01)
*A63F 13/00* (2006.01)

(52) U.S. Cl. ............................ 463/20; 463/16; 463/17; 463/18; 463/19; 463/30; 463/31; 463/32

(58) Field of Classification Search ..................... 463/1, 463/10–22, 31–33, 40–42; 273/138.1, 141 R, 273/142 R, 143 R, 292
See application file for complete search history.

(56) References Cited

U.S. PATENT DOCUMENTS 2,545,644 A 3/1951 Benton et al.

(Continued)

FOREIGN PATENT DOCUMENTS

AU 199716432 B2 9/1997

(Continued)

OTHER PUBLICATIONS

"Rubiks Cube NPL", http://web.archive.org/web/20010303012646/rubiks.com/cubemore.html, http://web.archive.org/web/20010303064729/rubiks.com/cubehints.html, http://web.archive.org/web/20010303002844/rubiks.com/cubesolution_new.html, and http://web.archive.org/web/19991115033853/rubiks.com/cubehistory.html, as of Jul. 20, 2001 through archive.org.*

(Continued)

*Primary Examiner*—Dmitry Suhol
*Assistant Examiner*—Steven J. Hylinski
(74) *Attorney, Agent, or Firm*—K&L Gates LLP

(57) ABSTRACT

A method of playing a game on a gaming machine is performed by placing a wager on an underlying wagering game and playing the underlying wagering game according to the rules of the underlying game. When a predetermined event occurs in the underlying game, the player enters at least one bonus game. The bonus game may have at least one event where a) an animated event proceeds to a conclusion and an original bonus that increments or decrements with the proceeding of that animated event, and b) using a sequential set of displays to determine a number of spins to be used in a bonus round and to determine a multiplication factor to be used in spins to be used in the bonus round.

37 Claims, 4 Drawing Sheets

U.S. PATENT DOCUMENTS 2,743,108 A 4/1956 Sanders
3,904,207 A 9/1975 Gold
4,198,052 A 4/1980 Gauselmann
4,258,838 A 3/1981 Rockola et al.
4,410,178 A 10/1983 Partridge
4,410,179 A * 10/1983 Rubik ..................... 273/153 S
4,448,419 A 5/1984 Telnaes
4,513,970 A 4/1985 Opresco et al.
4,560,161 A 12/1985 Hamano
4,582,324 A 4/1986 Koza et al.
4,586,713 A 5/1986 Abu-Shumays et al.
4,618,150 A 10/1986 Kimura
4,624,459 A 11/1986 Kaufman
4,695,053 A 9/1987 Vazquez, Jr. et al.
4,706,956 A 11/1987 Abu-Shumays et al.
4,756,531 A 7/1988 DiRe et al.
4,775,155 A 10/1988 Lees
4,805,907 A 2/1989 Haiwara
4,817,952 A 4/1989 Biro et al.
4,836,553 A 6/1989 Suttle et al.
4,838,552 A 6/1989 Hagiwara
4,844,467 A 7/1989 Gyenge et al.
4,861,041 A 8/1989 Jones et al.
4,871,171 A 10/1989 Rivero
4,874,173 A 10/1989 Hagiwara
4,889,340 A 12/1989 Greene
4,991,848 A 2/1991 Greenwood et al.
5,019,973 A 5/1991 Wilcox et al.
5,033,744 A 7/1991 Bridgeman et al.
5,085,436 A 2/1992 Bennett
5,092,598 A 3/1992 Kamille
5,098,107 A 3/1992 Boylan et al.
5,102,134 A 4/1992 Smyth
5,102,137 A 4/1992 Ekiert
5,167,413 A 12/1992 Fulton
5,178,390 A 1/1993 Okada
5,205,555 A 4/1993 Hamano
5,209,479 A 5/1993 Nagao et al.
5,211,399 A 5/1993 Howard
5,249,800 A 10/1993 Hilgendorf et al.
5,259,616 A 11/1993 Bergmann
5,288,077 A 2/1994 Jones
5,288,081 A 2/1994 Breeding
5,312,113 A * 5/1994 Ta-Hsien et al. ............... 463/9
5,332,219 A 7/1994 Marnell, II et al.
5,342,047 A 8/1994 Heidel et al.
5,342,049 A 8/1994 Wichinsky et al.
5,344,145 A * 9/1994 Chadwick et al. ............. 463/31
5,362,052 A * 11/1994 Kubatsch ................ 273/145 R
5,364,100 A 11/1994 Ludlow et al.
5,364,105 A 11/1994 Jones
5,377,973 A 1/1995 Jones et al.
5,393,057 A 2/1995 Marnell, II
5,393,061 A 2/1995 Manship et al.
5,395,111 A 3/1995 Inoue
5,407,200 A 4/1995 Zalabak
5,411,271 A * 5/1995 Mirando ........................ 463/9
5,429,507 A 7/1995 Kaplan
5,431,407 A 7/1995 Hofberg et al.
5,437,462 A 8/1995 Breeding
5,452,899 A 9/1995 Skratulia et al.
5,456,465 A 10/1995 Durham
5,463,084 A * 10/1995 Crivello et al. .............. 549/214
5,490,670 A 2/1996 Hobert
5,494,287 A 2/1996 Manz
5,511,781 A 4/1996 Wood et al.
5,515,486 A 5/1996 Amro et al.
5,524,888 A 6/1996 Heidel
5,529,309 A 6/1996 Bartlett
5,531,440 A 7/1996 Dabrowski et al.
5,531,441 A 7/1996 Dabrowski et al.
5,536,016 A 7/1996 Thompson
5,542,669 A 8/1996 Charron et al.
5,560,603 A 10/1996 Seelig et al.
5,569,084 A 10/1996 Nicastro et al.
5,577,731 A 11/1996 Jones
5,584,485 A 12/1996 Jones et al.
5,607,162 A 3/1997 Boylan et al.
5,611,535 A 3/1997 Tiberio
5,626,341 A 5/1997 Jones et al.
5,639,089 A 6/1997 Matsumoto et al.
5,642,882 A 7/1997 Guerzini
5,642,884 A 7/1997 Pitcher
5,647,798 A 7/1997 Falciglia
5,655,965 A 8/1997 Takemoto et al.
5,660,391 A 8/1997 Klasee
5,660,393 A 8/1997 Dreger
5,664,781 A 9/1997 Feola
5,711,525 A 1/1998 Breeding
D392,340 S 3/1998 DeSimone
5,722,891 A 3/1998 Inoue
5,732,948 A 3/1998 Yoseloff
5,743,524 A 4/1998 Nannicola
5,752,881 A 5/1998 Inoue
5,755,619 A 5/1998 Matsumoto et al.
5,766,074 A 6/1998 Cannon et al.
5,769,716 A 6/1998 Saffari et al.
5,772,509 A 6/1998 Weiss
5,775,692 A 7/1998 Watts et al.
5,788,573 A 8/1998 Baerlocher et al.
5,794,964 A 8/1998 Jones et al.
5,795,225 A 8/1998 Jones et al.
5,807,172 A 9/1998 Piechowiak
5,823,873 A 10/1998 Moody
5,823,874 A 10/1998 Adams
5,833,536 A 11/1998 Davids et al.
5,836,041 A 11/1998 Kleinpell, II et al.
5,848,932 A 12/1998 Adams
5,851,148 A 12/1998 Brune et al.
5,855,514 A 1/1999 Kamille
5,863,041 A 1/1999 Boylan et al.
5,873,781 A 2/1999 Keane
5,882,258 A * 3/1999 Kelly et al. ................... 463/11
5,882,261 A 3/1999 Adams
5,885,157 A 3/1999 Harada et al.
5,890,962 A 4/1999 Takemoto
5,893,718 A 4/1999 O'Donnell
5,911,418 A 6/1999 Adams
5,919,088 A 7/1999 Weiss
5,921,864 A * 7/1999 Walker et al. .................. 463/9
5,927,714 A 7/1999 Kaplan
5,934,672 A 8/1999 Sines et al.
5,935,002 A 8/1999 Falciglia
5,944,605 A * 8/1999 Pajitnov ........................ 463/9
5,947,820 A 9/1999 Morro et al.
5,951,397 A 9/1999 Dickinson
5,964,463 A 10/1999 Moore, Jr.
5,967,894 A 10/1999 Kinoshita et al.
5,976,016 A 11/1999 Moody et al.
5,980,384 A 11/1999 Barrie
5,984,781 A 11/1999 Sunaga
5,996,997 A 12/1999 Kamille
5,997,400 A 12/1999 Seelig et al.
5,997,401 A 12/1999 Crawford
6,004,207 A 12/1999 Wilson, Jr. et al.
6,007,066 A 12/1999 Moody
6,015,346 A 1/2000 Bennett
6,019,369 A 2/2000 Nakagawa et al.
6,033,307 A 3/2000 Vancura
6,056,642 A 5/2000 Bennett
6,059,289 A 5/2000 Vancura
6,059,658 A 5/2000 Mangano et al.
6,062,978 A * 5/2000 Martino et al. ................. 463/9
6,062,980 A 5/2000 Luciano

| | | | |
|---|---|---|---|
| 6,086,066 | A | 7/2000 | Takeuchi et al. |
| 6,089,976 | A | 7/2000 | Schneider et al. |
| 6,089,978 | A | 7/2000 | Adams |
| 6,093,102 | A | 7/2000 | Bennett |
| 6,095,921 | A | 8/2000 | Walker et al. |
| 6,102,796 | A * | 8/2000 | Pajitnov et al. ................ 463/9 |
| 6,102,798 | A | 8/2000 | Bennett |
| 6,117,009 | A | 9/2000 | Yoseloff |
| 6,120,031 | A | 9/2000 | Adams |
| 6,120,377 | A | 9/2000 | McGinnis, Sr. et al. |
| 6,120,378 | A | 9/2000 | Moody |
| 6,126,541 | A | 10/2000 | Fuchs |
| 6,126,542 | A | 10/2000 | Fier |
| 6,135,884 | A | 10/2000 | Hedrick et al. |
| 6,135,885 | A | 10/2000 | Lermusiaux |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,521 | A | 11/2000 | Sanduski |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,409 | B1 | 3/2001 | Kennedy et al. |
| 6,203,428 | B1 | 3/2001 | Giobbi et al. |
| 6,203,429 | B1 | 3/2001 | Demar et al. |
| 6,210,279 | B1 | 4/2001 | Dickinson |
| 6,213,875 | B1 | 4/2001 | Suzuki |
| 6,213,876 | B1 | 4/2001 | Moore, Jr. |
| 6,217,023 | B1 | 4/2001 | Kremer |
| 6,224,483 | B1 | 5/2001 | Mayeroff |
| 6,224,484 | B1 | 5/2001 | Okuda et al. |
| 6,227,970 | B1 | 5/2001 | Shimizu et al. |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,241,607 | B1 | 6/2001 | Payne et al. |
| 6,251,013 | B1 | 6/2001 | Bennett |
| D445,841 | S | 7/2001 | Sabo |
| 6,261,177 | B1 | 7/2001 | Bennett |
| 6,264,198 | B1 * | 7/2001 | Stamper ................. 273/157 R |
| 6,270,408 | B1 | 8/2001 | Sakamoto et al. |
| 6,270,409 | B1 | 8/2001 | Shuster |
| 6,270,411 | B1 | 8/2001 | Gura et al. |
| 6,270,412 | B1 | 8/2001 | Crawford et al. |
| 6,287,194 | B1 | 9/2001 | Okada et al. |
| 6,290,600 | B1 | 9/2001 | Glasson |
| 6,296,568 | B1 | 10/2001 | Tracy |
| 6,299,165 | B1 | 10/2001 | Nagano |
| 6,302,790 | B1 | 10/2001 | Brossard |
| 6,305,686 | B1 | 10/2001 | Perrie et al. |
| 6,309,300 | B1 | 10/2001 | Glavich |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher |
| 6,322,309 | B1 | 11/2001 | Baerlocher et al. |
| 6,328,649 | B1 | 12/2001 | Randall et al. |
| 6,334,814 | B1 * | 1/2002 | Adams ........................ 463/20 |
| 6,336,860 | B1 | 1/2002 | Webb |
| 6,336,863 | B1 | 1/2002 | Baerlocher et al. |
| 6,340,158 | B2 | 1/2002 | Pierce et al. |
| 6,346,043 | B1 | 2/2002 | Colin et al. |
| 6,347,996 | B1 | 2/2002 | Gilmore et al. |
| 6,358,147 | B1 | 3/2002 | Jaffe et al. |
| 6,364,766 | B1 * | 4/2002 | Anderson et al. ............. 463/16 |
| 6,375,187 | B1 | 4/2002 | Baerlocher |
| D458,311 | S | 6/2002 | Seelig et al. |
| 6,398,218 | B1 | 6/2002 | Vancura |
| 6,398,641 | B1 * | 6/2002 | Yamagami et al. ............. 463/9 |
| 6,398,644 | B1 | 6/2002 | Perrie et al. |
| 6,398,645 | B1 | 6/2002 | Yoseloff |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,413,162 | B1 | 7/2002 | Baerlocher et al. |
| 6,416,408 | B2 | 7/2002 | Tracy et al. |
| 6,419,579 | B1 * | 7/2002 | Bennett ....................... 463/20 |
| 6,425,824 | B1 | 7/2002 | Baerlocher et al. |
| 6,428,412 | B1 | 8/2002 | Anderson et al. |
| 6,435,511 | B1 | 8/2002 | Vancura et al. |
| 6,439,995 | B1 | 8/2002 | Hughs-Baird et al. |
| D463,504 | S | 9/2002 | Stephan |
| 6,443,837 | B1 | 9/2002 | Jaffe et al. |
| 6,454,266 | B1 | 9/2002 | Breeding et al. |
| 6,454,651 | B1 | 9/2002 | Yoseloff |
| 6,461,241 | B1 | 10/2002 | Webb et al. |
| 6,464,582 | B1 | 10/2002 | Baerlocher et al. |
| 6,468,156 | B1 | 10/2002 | Hughs-Baird et al. |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,494,785 | B1 | 12/2002 | Gerrard et al. |
| 6,506,114 | B1 | 1/2003 | Estes et al. |
| 6,506,118 | B1 | 1/2003 | Baerlocher et al. |
| 6,511,375 | B1 | 1/2003 | Kaminkow |
| 6,514,141 | B1 | 2/2003 | Kaminkow et al. |
| 6,540,611 | B1 * | 4/2003 | Nagata ........................ 463/31 |
| 6,551,187 | B1 | 4/2003 | Jaffe |
| 6,554,703 | B1 | 4/2003 | Bussick et al. |
| 6,558,253 | B1 | 5/2003 | DeSimone et al. |
| 6,558,254 | B2 | 5/2003 | Baelocher et al. |
| 6,561,904 | B2 | 5/2003 | Locke et al. |
| 6,565,436 | B1 | 5/2003 | Baerlocher |
| 6,569,015 | B1 | 5/2003 | Baerlocher et al. |
| 6,569,016 | B1 | 5/2003 | Baerlocher |
| 6,572,471 | B1 | 6/2003 | Bennett |
| 6,572,473 | B1 | 6/2003 | Baerlocher |
| 6,575,830 | B2 | 6/2003 | Baerlocher et al. |
| 6,579,178 | B1 * | 6/2003 | Walker et al. ................. 463/20 |
| 6,582,306 | B1 * | 6/2003 | Kaminkow .................. 463/20 |
| 6,585,591 | B1 | 7/2003 | Baerlocher et al. |
| 6,589,114 | B2 | 7/2003 | Rose |
| 6,592,457 | B1 | 7/2003 | Frohm et al. |
| 6,595,854 | B2 | 7/2003 | Hughs-Baird et al. |
| 6,599,185 | B1 | 7/2003 | Kaminkow et al. |
| 6,599,192 | B1 | 7/2003 | Baerlocher et al. |
| 6,602,137 | B2 | 8/2003 | Kaminkow et al. |
| 6,605,002 | B2 | 8/2003 | Baerlocher |
| 6,607,437 | B2 | 8/2003 | Casey et al. |
| 6,607,438 | B2 | 8/2003 | Baerlocher et al. |
| 6,609,974 | B2 | 8/2003 | Mead et al. |
| 6,632,139 | B1 | 10/2003 | Baerlocher |
| 6,632,141 | B2 | 10/2003 | Webb et al. |
| 6,634,941 | B2 * | 10/2003 | Olive .......................... 463/16 |
| 6,634,943 | B1 | 10/2003 | Baerlocher |
| 6,638,164 | B2 | 10/2003 | Randall et al. |
| 6,644,664 | B2 * | 11/2003 | Muir et al. .................. 273/146 |
| 6,648,759 | B2 | 11/2003 | Vancura |
| 6,676,512 | B2 | 1/2004 | Fong et al. |

| | | | | |
|---|---|---|---|---|
| 6,682,419 | B2 | 1/2004 | Webb et al. | |
| 6,682,420 | B2 | 1/2004 | Webb et al. | |
| 6,685,561 | B2 * | 2/2004 | Anderson et al. | 463/16 |
| 6,719,630 | B1 * | 4/2004 | Seelig et al. | 463/16 |
| 6,733,389 | B2 | 5/2004 | Webb et al. | |
| 6,746,329 | B1 * | 6/2004 | Duhamel | 463/20 |
| 6,769,690 | B1 | 8/2004 | Khoudary | |
| 6,780,105 | B1 | 8/2004 | Kaminkow | |
| 6,840,858 | B2 | 1/2005 | Adams | |
| 6,881,146 | B2 | 4/2005 | Anderson et al. | |
| 6,932,700 | B2 * | 8/2005 | Bennett et al. | 463/20 |
| 6,974,130 | B2 * | 12/2005 | Sugden | 273/153 S |
| 6,981,917 | B2 | 1/2006 | Webb et al. | |
| 6,983,935 | B2 * | 1/2006 | Kaminkow | 273/139 |
| 7,169,046 | B2 | 1/2007 | Webb et al. | |
| 7,204,754 | B2 * | 4/2007 | Gray et al. | 463/16 |
| 7,210,997 | B2 * | 5/2007 | Hughs-Baird et al. | 463/20 |
| 7,229,350 | B2 | 6/2007 | Baerlocher et al. | |
| 7,331,859 | B2 * | 2/2008 | Hornik et al. | 463/16 |
| 7,455,585 | B2 * | 11/2008 | Englman | 463/16 |
| 2002/0025844 | A1 | 2/2002 | Casey et al. | |
| 2002/0037764 | A1 * | 3/2002 | Anderson et al. | 463/16 |
| 2002/0045475 | A1 | 4/2002 | Glavich et al. | |
| 2002/0072402 | A1 | 6/2002 | Baerlocher | |
| 2002/0094857 | A1 * | 7/2002 | Meyer | 463/16 |
| 2002/0119824 | A1 * | 8/2002 | Allen | 463/42 |
| 2002/0132660 | A1 * | 9/2002 | Taylor | 463/16 |
| 2002/0142822 | A1 | 10/2002 | Baerlocher et al. | |
| 2002/0151350 | A1 | 10/2002 | Baerlocher et al. | |
| 2002/0155883 | A1 | 10/2002 | Baerlocher | |
| 2003/0013514 | A1 | 1/2003 | Cregan et al. | |
| 2003/0027619 | A1 * | 2/2003 | Nicastro, Sr. | 463/16 |
| 2003/0040355 | A1 | 2/2003 | Baerlocher | |
| 2003/0045344 | A1 | 3/2003 | Webb et al. | |
| 2003/0045348 | A1 | 3/2003 | Palmer et al. | |
| 2003/0054875 | A1 | 3/2003 | Marks et al. | |
| 2003/0064795 | A1 | 4/2003 | Baerlocher et al. | |
| 2003/0125107 | A1 * | 7/2003 | Cannon | 463/25 |
| 2003/0222401 | A1 * | 12/2003 | Kaminkow | 273/292 |
| 2004/0009803 | A1 * | 1/2004 | Bennett et al. | 463/16 |
| 2004/0038731 | A1 | 2/2004 | Englman | |
| 2004/0053683 | A1 | 3/2004 | Hartl et al. | |
| 2004/0198485 | A1 * | 10/2004 | Loose et al. | 463/20 |
| 2005/0070353 | A1 | 3/2005 | Webb et al. | |
| 2005/0104298 | A1 | 5/2005 | Butcher et al. | |
| 2006/0052155 | A1 * | 3/2006 | Inoue | 463/20 |
| 2006/0135245 | A1 | 6/2006 | Hedrick et al. | |
| 2006/0160606 | A1 * | 7/2006 | Duhamel | 463/20 |
| 2006/0252492 | A1 * | 11/2006 | Anderson et al. | 463/17 |
| 2006/0252517 | A1 * | 11/2006 | Walker et al. | 463/25 |
| 2007/0117610 | A1 | 5/2007 | Webb et al. | |

FOREIGN PATENT DOCUMENTS

| | | | |
|---|---|---|---|
| AU | A-50327/96 | | 10/1997 |
| AU | A-63553/98 | | 10/1998 |
| DE | 3700861 | A1 | 7/1988 |
| DE | 4014477 | A1 | 7/1991 |
| EP | 0410789 | A2 | 7/1990 |
| EP | 0410789 | A3 | 7/1990 |
| EP | 0688002 | A1 | 12/1995 |
| EP | 0 798 676 | A1 | 10/1997 |
| EP | 0874337 | A1 | 10/1998 |
| EP | 0926645 | A2 | 6/1999 |
| EP | 0 945 837 | A2 | 9/1999 |
| EP | 0944030 | A2 | 9/1999 |
| EP | 0984409 | A2 | 8/2000 |
| GB | 2 072 395 | A | 9/1981 |
| GB | 2 083 936 | A | 3/1982 |
| GB | 2 092 797 | | 8/1982 |
| GB | 2 137 392 | | 10/1984 |
| GB | 2 144 644 | A | 3/1985 |
| GB | 2 191 030 | | 12/1987 |
| GB | 2 201 821 | A | 9/1988 |
| GB | 2 202 984 | A | 10/1988 |
| GB | 2 253 300 | A | 2/1992 |
| GB | 2 328 311 | A | 2/1999 |
| WO | WO 93/03464 | | 2/1993 |
| WO | WO 9732285 | | 9/1997 |
| WO | WO 0012186 | | 3/2000 |

OTHER PUBLICATIONS

1DU Dice Unit Advertisement [online] [retrieved from the Internet May 14, 2001] <URL:http://www.starpoint.uk.com/1du.htm>.

3-Way Action Poker Brochure and Article written by written by IGT, published in 2002, on or before December thereof.

Addams Family Advertisement and Article written by IGT, Strictly Slots, published in 2000, on or before December thereof.

American Thunder Screen Shots written by IGT, published in 1998, on or before December thereof.

Bally Slot Machines Electro-Mechanicals 1964-1980 (on or before December thereof) Book [In Part], Revised 3rd Edition written by Marshall Fey.

Big Bang Piggy Bankin Advertisement written by WMS Gaming, Inc., published prior to 2000, on or before December thereof.

Bonus Times Article written by Bally Gaming, published in 2000, on or before December thereof.

Bunco Night Advertisement, International Game Technology, 2002, on or before December thereof.

By George Advertisement, International Game Technology, 2002, on or before December thereof.

Cash Box Advertisement & Article written by Anchor Games, Strictly Slots, published in 2000, on or before December thereof.

Cash Crop Brochure written by Arist O Crat Leisure Industries, published in 1997, on or before December thereof.

Chutes & Ladders Game Instructions written by Hasbro-Milton Bradley, published in 1999, on or before December thereof.

Cuckoo Aristocrat Brochure written by Aristocrat, published in Feb. 1998, on or before December thereof.

Dice Games Article describing Poker Dice, published prior to 2001, on or before December thereof.

Enchanted Unicorn Advertisement written by IGT, published in 2001.

Faster Harder More Challenging Q*bert game description [online] [retrieved from the Internet Mar. 12, 2002] written by The Killer List of Videogames, <URL:http://www.klov.com/F/Faster_Harder_More_Challenging_Q*bert.html>.

Field Testing New Slots Article, written by Strictly Slots, published in Jul. 2000.

Fire and Fortune Article in Strictly Slots, Anchor Games, May 2001.

Fox "N" Hound Advertisement written by IGT, published in 2000, on or before December thereof.

Free! 7-Day Trial on Daval's Reel Dice Advertisement written by Gerber & Glass, published in 1936, on or before December thereof.

Fundamentals of Craps Book [In Part], written by Mason Malmuth and Lynne Loomis, published in 1995, on or before December thereof.

Good Times Brochure written by IGT, published in 1999, on or before December thereof.

Gotlieb Emulator Project written by Lee Taylor, [online] [retrieved from the Internet Mar. 12, 2002] <URL:http://www.defender.demon.co.uk/qbert.html>.

How to play Q*bert written by Gottlieb Amusement Games, [online] [retrieved from the Internet Mar. 12, 2002] <URL: http://users.rcn.com/e-glide/howto1.jpg> and <URL:http://users.rcn.com/e-glide/howto2.jpg>.

I Love Lucy Advertisement written by IGT, published in 2002, on or before December thereof.

In Between Game Description written by IGT, available prior to 2000, on or before Decemner thereof.

Jackpot Party Brochures and Articles, written by WMS Gaming, Inc., published in 1998, on or before December thereof.

Leopard Spots™ (website) [online] [retrieved from the Internet Mar. 12, 2001] <URL:www.igt.com>.

Levy Patent Abstract written by Derwent Publications Ltd., published in 1991, on or before December thereof.
Loaded Dice Strictly Slots Article, Konami, Dec. 2000.
Mega Multiplier® (website) [online] [retrieved from the Internet May 22, 2001] <URL:www.wmsgaming.com>.
Mikohn Solutions Article in the World Gaming Congress 2000 Edition, on or before December thereof.
Money Grab (website) [online] [retrieved from the Internet May 22, 2001] <IURL:www.wmsgaming.com>.
Money Grab Article written by Strictly Slots, published in Apr. 2001.
Money Mouse Brochure written by Arist O Crat Leisure Industries, published in 1997, on or before December thereof.
Monopoly Brochures and Articles written by WMS Gaming, Inc. published 1998, on or before December thereof.
Monopoly Party Train Article written by Strictly Slots, published Feb. 2002.
Neon Nights written by IGT, published in 2000, on or before December thereof.
New Kids Article written by Strictly Slots, published in December 2000.
On the Money Article written by Strictly Slots, Casino Data Systems, published in Dec. 2000.
Pick'em Poker Plus Advertisement written by Ball Gaming Systems in 2002.
Penguin Pays written in Commentary in Strictly Slots/Aristocrat in Apr. 1999.
Polly & Roger Brochure written by VLC, Inc, published in 2000, on or before December thereof.
Price is Right "Cliff Hangers" Description [online] [retrieved from the Internet Mar. 21, 2001] <URL:www.geocities.com; members.aol.com>.
Price is Right "Showcases" Description [online] [retrieved from the Internet Mar. 16, 2001] <URL:schuminweb.com>.
Q*bert board game instructions written by Parker Brothers, published in 1983, on or before December thereof.
Q*bert game description written by The Killer List of Videogames [online] [retrieved from the Internet Mar. 12, 2002] <URL: http://www.klov.com/Q/Q*bert.html>.
Q*Bert video game advertisement written by Pennsylvania Gameroom Warehouse, [online] [retrieved from the Internet Mar. 12, 2002] <URL: http://www.gameroomwarehouse.com/videogame/qbert.html>.
Q*bert video game cartridge instructions for ATARI 2600 game system written by Parker Brothers, [online] [retrieved from the Internet Feb. 12, 2002] <URL: http://www.hasbro.com/default.asp?x=cc_gameandtoyinstructions>.
Q*bert video game cartridge instructions for ATARI home computer written by Parker Brothers and Arcade/Action Software, [online] [retrieved from the Internet Mar. 12, 2002] <URL: http://www.hasbro.com/default.asp?x=cc_gameandtoyinstructions>.
Q*bert video game cartridge instructions for Colecovision game system written by Parker Brothers, [online] [retrieved from the Internet Mar. 12, 2002] <URL:http://www.hasbro.com/default.asp?x=cc_gameandtoyinstructions>.
Q*bert video game cartridge instructions for Commodore 64 game system written by Parker Brothers and Arcade/Action Software, [online] [retrieved from the Internet Mar. 12, 2002] <URL: http://www.hasbro.com/default.asp?x=cc_gameandtoyinstructions>.
Q*bert video game cartridge instructions for Intellivision game system written by Parker Brothers, [online] [retrieved from the Internet Mar. 12, 2002] <URL: http://www.hasbro.com/default.asp?x=cc_gameandtoyinstructions>.
Q*bert video game cartridge instructions for Texas Instruments 99/4A game system written by Parker Brothers and Arcade/Action Software, [online] [retrieved from the Internet Mar. 12, 2002] <URL: http://www.hasbro.com/default.asp?x=cc_gameandtoyinstructions>.
Q*bert: Classic Video Game Surrealism from the Golden Age of Arcade Games written by e-glide [online] [retrieved from the Internet Mar. 12, 2002] <URL: http://users.rcn.com/e-glide/qbert2.html>.
Q*bert's Qubes game description written by The Killer List of Videogames [online] [retrieved from the Internet Mar. 12, 2002] <URL: http://www.klov.com/Q/Q*bert's_Qubes.html>.
Q-Bert video game advertisement for PlayStation [online] [retrieved from the Internet Mar. 12, 2002] <URL: http://www.amazon.com>.
Richard Petty Advertisement written by IGT, published in 2000, on or before December thereof.
Roll & Win Advertisement written by WMS Gaming, wmsgaming.com, printed Jun. 8, 2001.
Slot Machines Article by Marshall Fey, published 1983, 1989, 1991, 1994 and 1997.
Slot Machine Buyer's Handbook, A Consumer's Guide to Slot Machines [In Part] written by David L. Saul and Daniel R. Mead, published 1998, on or before December thereof.
Slot Machines A Pictorial History of the First 100 Years, 5th edition [In Part], written by Marshall Fey, published 1983 to 1997, on or before December thereof.
Slot Machines On Parade [In Part] written by Robert N. Geddes and illustrated by Daniel R. Mead, published 1980, on or before December thereof.
South Park—Dodgeball Advertisement written by IGT, published in 2000, on or before December thereof.
Spam Article written by IGT, published in 2002, on or before December thereof.
Spell Binder Advertisement written by IGT, published in 2000, on or before December thereof.
Stars, Bars and Bones Game Description written by P&M Coins, Inc. available 1997, on before December thereof.
Super Cherry Advertisement written by International Game Technology in 2001.
Take Your Pick Advertisement written by IGT/Anchor Gaming, published in 1999, on or before December thereof.
Take Your Pick Article, Strictly Slots, published Mar. 2001.
Texas Tea Advertisement Written by IGT, published in 2000, on or before December thereof.
The Creation of Q*Bert written by Warren Davis, [online] [retrieved from the Internet Mar. 12, 2002] <URL: http://www.coinop.org/features/qbstory.html>.
The History of Q*Bert written by Jeff Lee, [online] [retrieved from the Internet Mar. 12, 2002] <URL: http://users.aol.com/JPMLee/qbert.htm>.
Top Dollar Brochure written by IGT, published in 1998, on or before December thereof.
Vision Series™/Good Times™ Brochure written by IGT, published in 1999, on or before December thereof.
Wheel Poker Article written by Strictly Slots (Anchor Games), published in Nov. 2000.
Winning Streak Web Site Description written by WMS Gaming Inc. (web site), printed on Mar. 21, 2001.
X Factor Brochure and Website Page written by WMS Gaming, Inc., published in 1998, on or before December thereof.
Yahtzee Bonus Advertisement, written by Mikohn Winning Solutions Worldwide, published 1999, on or before Decemner thereof.
Yahtzee Video Game Advertisement, written by Mikohn Winning Solutions Worldwide, published 1999, on or before December thereof.
Fortune Cookie Brochure published by IGT in 2000.
Totally Puzzled™ Brochure, available prior to Sep. 7, 2005.
Totally Puzzled™ Video Slots Brochure, written by IGT, published in 2004, Official Release dated Feb. 4, 2005.
Legal Notice at Rubik's Official Online Site www.rubiks.com, Jul. 26, 2005.

* cited by examiner

GAMING DEVICE HAVING A PUZZLE FUNCTION OPERABLE TO INDICATE INFORMATION RELATED TO A GAME EVENT

PRIORITY CLAIM

This application is a divisional of and claims priority to and the benefit of U.S. patent application Ser. No. 10/244,054, filed on Sep. 12, 2002 now U.S. Pat. No. 6,960,134, entitled "Alternative Bonus Game Associated With A Slot Machine," the entire disclosure of which is incorporated herein.

CROSS REFERENCE TO RELATED APPLICATIONS

This application is related to the following commonly-owned co-pending patent applications: "Alternative Bonus Game Associated With A Slot Machine," Ser. No. 10/244,054; and "Gaming Device Having An Indicator Operable To Indicate Primary Game Outcomes And Associated Bonus Game Opportunities," Ser. No. 11/223,865.

BACKGROUND

The present invention relates to wagering games, particularly apparatus-based wagering games generally referred to under the term of slot machines, video gaming machines and computer-based wagering games running on these machines, and methods of playing games on these machines.

Games of chance have been enjoyed by people for thousands of years and have enjoyed increased and widespread popularity in recent times. As with most forms of entertainment, players enjoy playing a wide variety of games and playing new games. Playing new games adds to the excitement of "gaming." As is well known in the art and as used herein, the term "gaming" and "gaming devices" are used to indicate that some form of wagering is involved, and that players must make wagers of value, whether actual currency or some equivalent of value, e.g., token or credit. This is an accepted distinction in the art from the playing of games, which implies the absence of a wager of value, capable of returning a payout and in which skill is ordinarily an essential part of the game. On the contrary, within the gaming industry, particularly in computer based gaming systems, the absence of skill is a jurisdictional requirement in the performance of the gaming play.

One popular gaming system of chance is the slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return value to the player. A standard device causes a plurality of reels to spin and ultimately stop, displaying a random combination of some form of indicia, for example, numbers or symbols. If this display contains one of a pre-selected number of winning combinations, the machine releases money into a payout chute or increments a credit meter by the amount won by the player. For example, if a player initially wagers two coins of a specific denomination and that player achieves a payout, that player may receive the same number as or multiples of the wager amount in coins of the same denomination as wagered.

There are many different formats for generating the random display of events that can occur to determine payouts in wagering devices. The standard or original format for slot machines was the use of three mechanical or electromechanical reels with symbols distributed over the face of the wheel. When the three reels were spun, they would eventually each stop in turn, displaying a combination of three symbols (e.g., with three reels and the use of a single payout line as a row in the middle of the area where the symbols are displayed). By appropriately distributing and varying the symbols on each of the reels, the random occurrence of predetermined winning combinations can be provided in mathematically predetermined probabilities. By clearly providing specific probabilities for each of the pre-selected winning outcomes, precise odds that control the amount of the payout for any particular combination and the percentage return on wagers for the house were reasonably controlled.

Other formats of gaming apparatus that have developed in a progression from the standard slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video gaming systems therefore were simulated slot machines. The use of video gaming apparatus to play new gaming applications such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct pay lines, including randomly placed lines, scatter pays, or single image payouts. In addition to the variation in formats for the play of gaming applications, bonus plays, bonus awards, and progressive jackpots have been introduced with great success. The bonuses may be associated with the play of gaming applications that are quite distinct from the play of the original gaming format, such as the video display of a horse race with "bets" on the individual horses randomly assigned to players that qualify for a bonus, the spinning of a random wheel with fixed amounts of a bonus payout on the wheel (or simulation thereof), or attempting to select a random card that is of higher value than a card exposed on behalf of a virtual "dealer."

Examples of such gaming apparatus with a distinct bonus feature includes U.S. Pat. Nos. 5,823,874; 5,848,932; 5,836,041; U.K. Patent Nos. 2 201 821A; 2 202 984A; and 2 072 395A; and German Patent DE 40 14 477AI. Each of these patents differs in fairly subtle ways as to the manner in which the bonus round is played. British Patent 2 201 821A and DE 37 00 861 AI describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment.

U.S. Pat. No. 6,062,978 (Martino et al.; Four Star Software, Inc.) shows a video game simulating a blend of a Rubik's Cube® device format and a Scrabble® game format or crossword puzzle format (See FIG. 4, for example). Color variations in the facings and frames are shown (Column 4, lines 4-16). No specific minimum number of frames is required, but six frames are 'preferred' and seven and eight frame constructions are shown, with no fewer than six frames ever being shown.

U.S. Pat. No. 4,817,952 (Biro et al., Rubik Studio) describes an electronic logical toy containing movable or rotatable elements. This apparatus is a literal electronic simulation of a Rubik's Cube® device by the originators of the device.

U.S. Pat. No. 4,889,340 (Greene et al.; Individual) describes a manipulation toy that allows display of various patterns of letters or words or symbols with moveable members on tracks. The tracks may be over a circular element. This merely shows alternative structures for the shape of a word/alphanumeric/symbol game display system that could be used in an electronic game.

U.S. Pat. No. 5,642,882 (Pitcher; Polaroid) describes puzzle solved by arranging visual information in a predetermined visually recognizable pattern. The pattern pieces arrange themselves in various forms such as puzzle pieces within a plane, perpendicular to a plane, or other geometric arrangements. This merely shows alternative structures for the shape of a word/alphanumeric/symbol game display system that could be used in an electronic game.

U.S. Pat. No. 6,364,766 describes a gaming machine comprising at least one visual display (mechanical or video) and a game of chance controlled by a processor in response to a wager. The game of chance includes a primary game and a sorting feature. The sorting feature is triggered by certain start-feature outcomes of the primary game. The sorting feature includes a collection of scrambled objects, such as letters, symbols, pictures, or puzzle pieces, that are at least partially sorted during operation of the sorting feature. The sorting feature generates an award, such as a payoff, a payoff multiplier, or extended play, if the sorted objects match predetermined criteria. In particular, the sorting feature in the broadest claim comprises: a sorting feature executed by said processor and displayed on one or more video displays, said sorting feature having a plurality of possible outcomes and a string of objects, the string collection of objects having a scrambled configuration and an unscrambled configuration, the string collection of objects being at least partially unscrambled from the scrambled configuration in response to random selection of at least one of the possible outcomes. The 'string' collection is exemplified by letters or numbers that form a definite pattern or word.

U.S. Pat. No. 6,334,814 describes a method of conducting a game of chance, comprising: providing an opportunity to place a wager to play a primary game; responsive at least in part to placement of a wager, randomly generating in the primary game a combination of indicia selected from a plurality of possible indicia and displaying the combination of indicia on a display associated with the primary game, the display comprising a visible representation of a plurality of reels, only one of the reels bearing an indicia for enabling play of a secondary game comprising a TIC-TAC-TOE game having a three-by-three matrix display associated therewith; and responsive to display on the one reel of the indicia for enabling play of the secondary game, randomly selecting indicia of a TIC-TAC-TOE game in the secondary game and displaying the selected indicia on the three-by-three matrix display.

U.S. Pat. No. 6,312,334 (Yoseloff) describes a method of playing a video wagering game. The method includes at least a first and second segment, the method comprising the steps of: placing a wager to participate in a video wagering game; playing the first segment of the video wagering game; continuing play of the first segment until at least one predetermined condition has been met; assigning a payout based on at least one predetermined winning outcome of the first segment; playing the second segment of the video wagering game when the at least one predetermined condition has been met; wherein at least a portion of said payout of the first segment is used as a wager in a second segment video wagering game in which a visually different screen format is used in play of a different game in the play of the second segment; and after play of the second segment video wagering game, a second segment payout is assigned based on at least a predetermined outcome of play of the second segment video wagering game.

U.S. Pat. No. 6,315,660 (WMS Gaming, Inc.) describes a gaming machine comprising: a processor for controlling a game of chance in a basic mode and a bonus mode, the processor being operable in the basic mode to select one or more basic game outcomes and in the bonus mode to select one or more bonus game outcomes; at least one display for displaying respective indicia of the selected outcomes; means associated with the processor for issuing game control instructions associated with the respective indicia, the game control instructions including a plurality of nominal executable instructions adapted for execution by the processor upon display of the respective indicia and at least one deferred executable instruction adapted for deferred execution by the processor, the deferred executable instruction including an override command executable by the processor in response to later displayed indicia, the override command being executable to override an end-game instruction associated with the later-displayed indicia.

U.S. Pat. No. 6,270,411 (WMS Gaming, Inc.)-describes a gaming machine, comprising: a basic game controlled by a processor in response to a wager amount, said basic game having a first display screen and at least one start bonus outcome occurring within said first display screen; and a bonus game activated by said start bonus outcome which causes said processor to provide an animation covering a portion less than all of said first display screen, said animation occurring automatically in response to said start bonus outcome without a triggering input from a player, said animation providing an animation payoff.

U.S. Pat. No. 6,203,409 describes a multi-step bonus game in which a processor controls a game of chance comprising: a) a processor, operating according to a game program, for randomly selecting symbols and for awarding credits when winning symbol combinations are selected; b) display means on which said selected symbol combinations are displayed to a game player; c) said processor operating in a basic mode unless and until a bonus symbol combination is selected, said processor, in said basic mode, selecting symbols and awarding credits or money in response to the input of money or credits by said player; d) said processor operating in a bonus mode after said bonus symbol combination is selected; said processor, in said bonus mode: (1) selecting an outcome as the result of a trial having a first probability of a winning outcome; (2) displaying the outcome on a display; (3) adding credits to a bonus mode total if said outcome is a winning outcome; (4) repeating steps d(I) to d(3) accumulating credits for each winning outcome using the same or a different probability of a winning outcome, until a losing outcome occurs wherein the bonus mode is ended and credits accumulated in earlier trials are not lost; whereby a player who reaches the bonus mode accumulates credits as a function of the number of trials survived.

U.S. Pat. No. 6,190,255 describes a bonus game for a slot machine operable in a basic mode and a bonus mode. The bonus game is entered upon the occurrence of a special start-bonus game outcome in the basic mode. In the bonus game, a player selects, one at a time, from an array of windows each associated with a bonus game outcome. Credits are awarded based upon which ones of the windows are selected. The bonus game ends upon selection of a window associated with an end-bonus outcome but otherwise continues, allowing the player to make further selections and accumulate further credits until encountering an end-bonus outcome. In one embodiment, a bonus game resource obtained in the basic game may be exercised in the bonus game to affect the bonus game outcome. In one embodiment, for example, where the occurrence of an end-bonus outcome would otherwise end the bonus game, a player having a bonus game resource may exercise the bonus game resource upon encountering an end-bonus outcome to continue playing the bonus game.

U.S. Pat. No. 6,159,098 describes a bonus game for a gaming machine with two types of awards. The bonus game includes a plurality of selection elements, a number of which are associated with an award of coin(s) or credit(s) and a number of which are associated with an end-bonus penalty. The game is played by selecting a number of the selection elements, one at a time, until encountering a selection element associated with an end-bonus penalty which ends the bonus game. A first award type in the bonus game is a selection-based award in which the player is credited an amount of coin(s) or credit(s) based on the value (or cumulative value) of the selection elements selected in the bonus game. A second award type in the bonus game is a quantity-based award in which the player is credited an amount of coin(s) or credit(s) based on the number of successful trials of the bonus game.

U.S. Pat. No. 6,159,097 describes a gaming machine comprising: a basic game controlled by a processor in response to a wager amount, said basic game having a plurality of different start-bonus outcomes; and a bonus game activated by said start-bonus outcomes which cause said processor to shift operation from said basic game to said bonus game, said bonus game capable of providing a plurality of bonus payouts, a probability of winning certain ones of said bonus payouts varying in response to said different start-bonus outcomes that activate said bonus game.

U.S. Pat. No. 6,004,207 describes a slot machine including a set of spinning reels having a plurality of symbols thereon, means for spinning and stopping said reels to display symbols, means for paying out prizes, and a processor operating according to a game program for controlling the spinning means and which defines a multiplier which sequentially increases in value, winning symbol combinations and standard prize amounts therefore, said processor including: a) means for randomly selecting symbols to be displayed by said spinning reels; b) means for determining if a winning combination has been selected for display and if a multiplier symbol is included in said winning combination; and c) means for calculating the prize to be awarded for said winning combinations based on the standard prize amounts multiplied by said variable multiplier, if the winning symbol combination includes said multiplier symbol.

It is desirable to provide alternative gaming formats and gaming methods, as the preferences of the players changes over time and new games with unique features are desired by the industry.

SUMMARY

An underlying gaming apparatus is provided with at least one and possibly more bonus or jackpot events. At least one of the bonus or jackpot events provides a unique format for bonus or jackpot events. One such bonus event may comprise a sequence where a predetermined event occurs in the underlying game, then a bonus game is entered, the bonus game comprising displaying of both a) an animated event that proceeds to a conclusion and b) an original bonus that increments or decrements with the passage of time during the proceeding of the animated event to a conclusion. Another such bonus event may comprise a) placing a wager on an underlying multiple display (multiple reel) wagering game using a first number of symbol displays (e.g., reels) in the underlying game, b) playing the underlying wagering game according to the rules of the underlying game, c) when a predetermined event occurs in the underlying game, d) entering a bonus game, the bonus game comprising using (less than all of) the symbol displays (e.g., reels) to determine a number of symbol display events (e.g., when reels are used, spins) to be used in a bonus round and to determine a multiplication factor to be used in symbol display events (e.g., spins) to be used in the bonus round, and e) playing a bonus game using the determined multiplier against any win attained in the bonus game. A preferred game comprises at least one of these novel bonus events along with a second bonus event.

DETAILED DESCRIPTION

Figure 1:
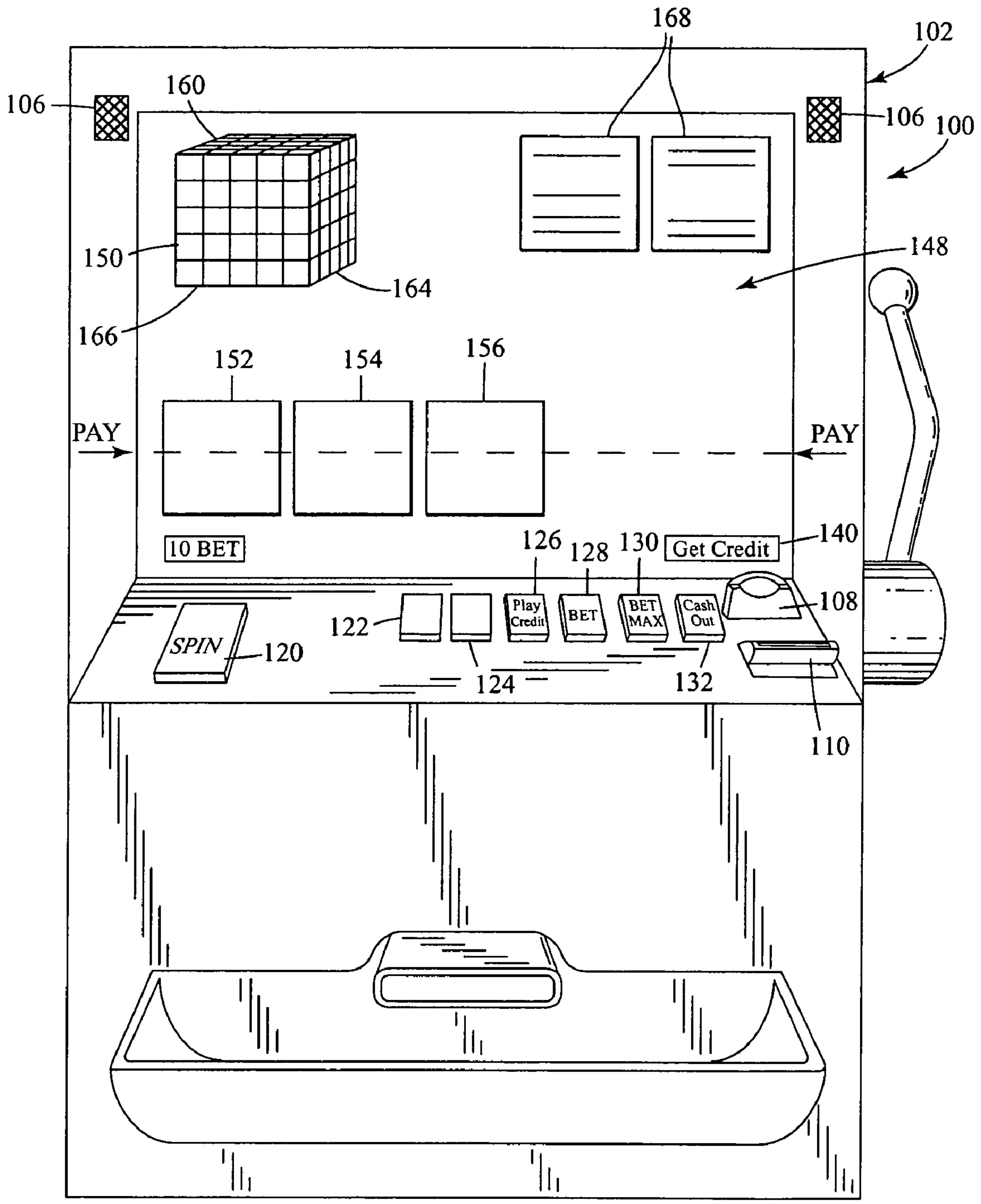
FIG. 1 shows a perspective view of a standard slot-type machine with three reels that provide the underlying predetermined event to trigger at least one bonus event shown as a Rubik's Cube device.

A game and gaming format is provided on a wagering apparatus, the gaming apparatus being a slot-type wagering apparatus. These gaming apparatus are referred to by many names in the art, including one-armed bandits, slot machines, and gaming machines. The specific style of the game, whether in video, mechanical or electromechanical format is not essential to the practice of this invention. The wagering format comprises a first set of symbol displays. Any of the many forms of displays for providing an underlying game, such as reels, virtual reels, card games (e.g., poker and poker variations, blackjack, war, etc), roulette, keno, and any conventional, nonconventional or new games may be used. A preferred and most convenient format of an underlying game or first game segment usually is provided in the form of reels, usually at least three reels such as the standard 3, 4 or 5 reels used on wagering devices. The first segment or underlying game is played according to the rules of the underlying game, with awards and play based on rules for the underlying game. During or after the play of the underlying game, a bonus event is to be entered. The entry to this bonus event may be by any format, play or circumstance that can be defined and is a non-critical element in the practice of the present invention, even if certain bonus entry events may be preferred. For example, bonus play may be entered by passage of time, number of plays of the machine, occurrence of a certain level of win, rank of symbol display, or display of particular symbols or combinations of symbols, display of particular arrangements of symbols, or other predetermined event in the play of the underlying game, including scatter pay event, where a certain symbol or specified number of certain symbols appears in any position(s) on the display screen at the end of a round of play.

The entry into the bonus round then may access one or more bonus events, either one bonus event at a time or accessing multiple bonus events or bonus sub-events upon entering the bonus round.

One novel bonus event in the practice of the invention comprises an opportunity to receive an initially fixed bonus amount that is displayed on a screen. The fixed bonus amount is awarded upon completion of an animated event that is automatically completed by a processor associated with the apparatus and displayed on a viewing system (e.g., video display, CRT, plasma screen, liquid crystal display, light emitting diode display, or any other image display system). The image displayed depicts an animated event, that is, the image changes over time as a player watches the image. The images changes from one form or state to another form or state. A preferred change or transition is represented by an image of a Rubik's Cube device. Initially shown on the screen, for example, would be a Rubik's Cube with the panels jumbled or randomized so that there are initially multiple colors of frames on at least some faces displayed on the display area. The screen then provides an image of segments of the Rubik's Cube device swiveling and rearranging to move towards an arrangement of panels of a desired color orientation, particularly an orientation where each entire cube face displays a single color (e.g., all frames on one face are red, all frames on another face are green, all frames on another face are yellow, all frames one another face are blue, all frames on another face are orange, and all frames on another face are white or black, the colors being incidental and not fundamentally important). All of the faces cannot be displayed at the same time, with only about three faces being actually viewable in the careen although with a full frontal view of one face, the edges of four adjacent faces along with the full frontal face can be seen.

At the beginning of this bonus event, as when the initial state of the display image is shown, a bonus award having some numerical value associated therewith is displayed. By 'a bonus award having some numerical value associated therewith' is meant a bonus that has an element or component that can be represented at least in part by an initial number or initial value. For example, the initial number or initial value may represent a fixed amount award (fixed amount at the beginning of the bonus event, so that a progressive jackpot, for example, could be initially available), a number of plays of the underlying game, a multiplier value for use in determining a bonus award, a number of selections of symbols or panels that may contain awards, and the like. As the display change occurs, this bonus award having some numerical quantity associated therewith changes while the display change occurs. The numerical quantity or numerical value may increase as the display changes or decrease as the display changes. By way of non-limiting examples, the following events may occur. As the Rubik's Cube device panels are automatically rearranging on the screen display (independent of any ongoing gaming play at an individual machine or networked machine), the following bonus altering events could occur:

1) With a fixed amount initial bonus (including a fixed amount jackpot bonus amount at the beginning of play), the bonus amount decreases as time passes. The initial amount is first displayed, and the amount displayed decrements a) with time increments (e.g., with every five or ten second of bonus play, the amount decrements by a fixed amount, a percentage, an increasing amount, a decreasing amount, or a varying amount), b) with event quanta (e.g., with each segment rotation of the Rubik's Cube device, with specific number(s) of segment rotations of the Rubik's Cube device [e.g., every time two separate segments rotate, when 2, 3, 4, 5 or more segments rotate], or c) as any other measurable non-award value increment or decrement occurs;

2) With a fixed amount initial bonus (including a fixed amount jackpot bonus amount at the beginning of play), the bonus amount increases as time passes. The initial amount is first displayed, and the amount displayed increments a) with time increments (e.g., with every five or ten second of bonus play, the amount decrements by a fixed amount, a percentage, an increasing amount, a decreasing amount, or a varying amount), b) with event quanta (e.g., with each segment rotation of the Rubik's Cube device, with specific number(s) of segment rotations of the Rubik's Cube device [e.g., every time two separate segments rotate, when 2, 3, 4, 5 or more segments rotate], or as any other measurable non-award value increment or decrement occurs;

3) With an initial fixed number of additional spins or plays, the bonus number of spins or plays decreases as time passes. The initial number of spins or plays is first displayed, and the number displayed decrements a) with time increments (e.g., with every five or ten second of bonus play, the number decrements by a fixed amount, a percentage, an increasing amount, a decreasing amount, or a varying amount), b) with event quanta (e.g., with each segment rotation of the Rubik's Cube device, with specific number(s) of segment rotations of the Rubik's Cube device [e.g., every time two separate segments rotate, when 2, 3, 4, 5 or more segments rotate], or c) as any other measurable non-award value increment or decrement occurs;

4) With a fixed initial number of additional spins or plays, the bonus number of spins or plays increases as time passes. The initial number of spins or plays is first displayed, and the initial number displayed increments a) with time increments (e.g., with every five or ten second of bonus play, the initial number decrements by a fixed amount, a percentage, an increasing amount, a decreasing amount, or a varying amount), b) with event quanta (e.g., with each segment rotation of the Rubik's Cube device, with specific number(s) of segment rotations of the Rubik's Cube device [e.g., every time two separate segments rotate, when 2, 3, 4, 5 or more segments rotate], or as any other measurable non-award value increment or decrement occurs;

5) With a fixed multiplier amount initial bonus, the initial bonus multiplier amount decreases as time passes. The initial multiplier amount is first displayed, and the amount displayed decrements a) with time increments (e.g., with every five or ten second of bonus play, the multiplier amount decrements by a fixed amount, a percentage, an increasing amount, a decreasing amount, or a varying amount), b) with event quanta (e.g., with each segment rotation of the Rubik's Cube device, with specific number(s) of segment rotations of the Rubik's Cube device [e.g., every time two separate segments rotate, when 2, 3, 4, 5 or more segments rotate], or c) as any other measurable non-award value increment or decrement occurs; and 6) With a fixed multiplier amount initial bonus, the initial bonus multiplier amount increases as time passes. The initial multiplier amount is first displayed, and the amount displayed increments a) with time increments (e.g., with every five or ten second of bonus play, the amount decrements by a fixed amount, a percentage, an increasing amount, a decreasing amount, or a varying amount), b) with event quanta (e.g., with each segment rotation of the Rubik's Cube device, with specific number(s) of segment rotations of the Rubik's Cube device [e.g., every time two separate segments rotate, when 2, 3, 4, 5 or more segments rotate], or as any other measurable non-award value increment or decrement occurs.

The exact nature of the changing event displayed on the screen is not critical to the fact that the bonus value or amount changes while that change event is occurring. The change event could be something as simple as a spinning wheel that is spun to initiate the animated event, and when the wheel (disk, reel, light display panel with traveling light) stops spinning or moving, the change in the initial bonus amount stops, independent of the symbols or displays on the wheel. A ball may be dropped, with bouncing attenuating, and bouncing ceases. A series of building blocks may self-assemble (e.g., in the manner of play of the Tetris® game), a building may be self-constructed, a Tic-Tac-Toe game may be played, a chess game may be played, a boxing match may occur, a horse race may occur, a demolition derby may be run, a steer may be roped, a carousel may rotate with riders attempting to grab a brass ring, a spinning top, or preferably any other event that does not have a time certain status (e.g., an egg timer, a sixty-second clock, etc.). A benefit is providing an image where anticipation is built up as the displayed event quickly or slowly approaches an outcome while the initial amount associated with the bonus changes as the display event progresses towards a conclusion. It is preferred that the displayed bonus award having some numerical quantity associated therewith decrements, but as noted above, an increment in the bonus award having some numerical quantity associated therewith is also an aspect of the invention. In that latter event, an occurrence such as stacking cards in a card house may be displayed, and the conclusion of the incrementing of the bonus award having some numerical quantity associated therewith would be when the house of cards tumbles. It is also of interest to note that the incrementing and decrementing of bonus awards having some numerical quantity associated therewith does not depend upon any actual game play or wagering play, but is related to the speed, number of sub-events, or other progression that is visualized while the bonus award having some numerical quantity associated therewith is altering. The amount of the final bonus award having some numerical quantity associated therewith is determined by a random number generator or some other programmed event prior to or during the visualized display event. The visualized display event occurs without the actual exercise of skill by the player or the machine. A preferred mechanism of play is for the processor to randomly select the amount of a bonus award to be made, and then associate that award with a visual display that occurs over a time period or a number of sub-events that will be appropriate for the amount of the award. For example, if the initial bonus award having some numerical quantity associated therewith was for 5,000 units (e.g., 5,000 coins or tokens) and the random number generator selects a 4,000 unit award, there might be only five or six segment rotations in the Rubik's Cube device. If the initial bonus award having some numerical quantity associated therewith was for 5,000 units (e.g., 5,000 coins or tokens) and the random number generator selects a 2,000 unit award, there might be twelve or fifteen segment rotations in the Rubik's Cube device. Similarly, if the maximum award is 5,000 units and the display event is building a house of cards, and the maximum bonus (of 5,000 units) is selected, an entire fifty-two card deck may be rapidly built on the screen. If a minimum bonus of, for example, 100 units is to be awarded, the bonus indicator might begin with 0 or 100 units shown, and the house of cards collapses when three cards are placed together.

The typical underlying wagering game, and particularly the reel-type wagering game, requires that at least one specific predetermined symbol, set of symbols, alignment of symbols, or the like be shown on the symbol display. There is usually a pay table or other source of information associated with the game that indicates what symbol(s) or combination(s) or set(s) provide a winning event. The classic standard gaming machine is comprised of a set of reels (e.g., 3, 4 or 5 reels, with 3, 4 or 5 columns and rows, in like or dissimilar numbers of columns and rows) with indicia displayed at various stop positions on the reels. The reels are spun and then stopped at a stop position, so that each reel displays a symbol (including a blank space as a potential 'symbol'). If the reels display particular symbols, symbols in particular positions, or predetermined combinations of symbols along a pay line, then a winning event occurs. A pay line on the original reel-type gaming equipment may constitute the outermost radial (central) positions on the stopped reels and the line that could be drawn through the outermost position on the stopped reel. Alternatively, as well known in the art, multiple pay lines may be available, particularly with five column and/or five row display reels. A line is usually drawn over a transparent faceplate to indicate the precise position of the pay line, which may depend upon the number of coins wagered, with from 1 to fifteen or more pay lines available and any number of scatter pay events being available. The original slot machines and many current slot machines have only one pay line.

A preferred gaming format is provided on a wagering apparatus using the following technologies:

1) A video gaming display that is in the active gaming portion display of a gaming machine.

2) There are at least one and preferably two distinct bonus rounds that are entered through a predetermined event, particularly scatter pay symbols of a specific type (e.g., miniature Rubik's Cubes® or light bulbs) and number (two or three symbols).

3) The underlying reel game is played on a virtual reel-type slot machine with three rows and five columns. There are, for example, nine different pay lines.

First Bonus Event

The preferred first bonus event passes directly to a virtual image of a Rubik's Cube® in a scrambled position, with the colors intermixed on the faces of the cubes. A bonus amount (e.g., 45,000 credits) is shown in a credit award area. The cube appears to auto-arrange itself, with rows and columns shifting in the manner of a real Rubik's Cube, attempting to display uniform colors on each of the cube faces. As time progresses, and the number of segment rotations increases during the virtual arrangement of the faces of the cube, the value of the award decrements (or less preferably increments). When the cube is completely arranged, the decreasing of the award stops, a final award value is displayed, and that final award is credited to the player.

Second Bonus Event

In a mandatory or optional second bonus event, a second predetermined event is required to initiate play in the bonus round. Any event may be used on, for example a 3.times.5 reel set, but a specific set of scatter pays are particularly programmed into the play of the game to be that predetermined event.

The bonus event begins by having one of the reels (e.g., the reel on the far left) spin and then slow down to show a pattern of colors, symbols or numbers. The outcome provides for different numbers of spins in the bonus round. For example, the symbol on the center pay line is “2”, indicating two bonus spins.

After the number of spins has been determined, another column (it theoretically could be the same column) such as the fifth reel, for example, spins to determine another facet of the bonus. The reel displays symbols that indicate a multiplier. The multiplier is chosen and will be applied to any bonus award won. At this point, there has been no crediting of bonus awards to a player, or even a bonus guaranteed for the player, even though two non-credit earning events have occurred in the bonus round.

After both the number of spins and the multiplier to be used (in any sequence of sub-event plays) in determining the amount of bonus have been randomly chosen, three of the columns forming a 3.times.3 reel (the system is presently programmed so that the three center columns are used) are spun in the manner of a conventional 3.times.3 reel slot system. Different symbol arrangements on the available pay lines (or scatter pays) provide a base award for that spin of the bonus event. The symbols on the three center reels may be the same or different than the symbols in the base game. In one example of the bonus feature all symbol positions bear a color on the 3.times.3 display. The amount won in any 3.times.3 reel spin event is then multiplied by the determined multiplier. This spin bonus event of the three reels is repeated for the number of spins won in the first event in the bonus game. The total amount won (after the application of the multiplier to each spin award) is then credited to the player. If there is no amount won in the bonus event, a consolation amount or even a bonus amount may be awarded.

It is noted that even though there may be ‘player activation’ or ‘player control’ displayed in the bonus event, all events are randomly selected by a microprocessor. The outcome may even be completely determined before the display of the first bonus event, or each bonus event is separately randomly selected in sequence.

In the play of the first bonus event, as non-limiting examples of formats of play, 1) The frames and faces may have the same number of frames or different colors from those used in the other bonus event or in any preliminary bonus event of game play for emphasis (and preferably have colors similar to those in a Rubik’s Cube®.

2) Each of the exposed faces in a cube in the bonus event may move in the manner of a Rubik’s Cube®, with segments of the cube rotating and displaying symbols (colors).

3) The faces of the cubes are displayed as frames of colors, e.g., 3.times.3.times.3 frames, and movement of the frames simulates planar movement, that is, three frames at a time move in unison rotating horizontally or vertically, as with a Rubik’s Cube® movement.

4) A time indicator is associated with the turning of the cube elements, with the time starting at an elevated or a base bonus award amount and the bonus decreases or increases, respectively, with time as the cube rearranges itself. As the time expires, the value of the bonus decreases or increases, respectively.

5) The movement of the Rubik’s Cube® is automatic and is not player controlled.

6) A consolation maybe offered if there is no winning combination of symbols (colors) appears on the cube face after the intermediate spin.

The symbols on the reels of the underlying game, if a reel-spinning event, have varied over the years, but certain symbols are considered ‘traditional,’ such as cherries, lemons, oranges, bars (single bars, double bars, triple bars), sevens, bells, plums, and the like. Virtual displays or any form of image displays, such as video displays may also be used to provide the symbol displays and the additional symbol displays. Other formats for displaying symbols may be used (such as uncovering hidden symbols behind panels by automatic or player induced opening of virtual panels), spinning of wheels to collect symbols, rolling of dice, dealing of cards, or any other activity in which a number of symbols are selected in the play of a first wagering game.

In the practice of the invention, a standard slot-type game may played on the first set of symbol displays, with predetermined combinations, alignments, positions, and/or types of symbols providing winning or losing first game events. This underlying game format allowing for what is known as scatter pay awards also. The play of this first underlying game produces a first set of symbols on at least one pay line. Coincident with the first game event, the additional symbol display provides an additional symbol that is compared with the symbols generated on the first set of symbol displays. Independent of the result of the first game events, whether that game event is a win, a push or a loss, the comparison of the additional symbol to the symbols generated on the first set of symbol displays provides a basis for additional awards on a potentially distinct set of play rules, with potentially different pay tables, and with different predetermined events providing awards.

The play of a game according to the present invention will be described with reference to the Figures. FIG. 1 shows a gaming apparatus 100 comprising a gaming box 102 and a game display area 148. Typical player controls such as spin button 120, help button 122, change button 124, Play/Credit button 126, Bet button 128, Bet Max button 130, Cash Out button 132, coin insert slot 108, currency insert slot 110, error lights 106, credit total display 140, Pay Line, reel display panels 152, 154 and 156 are shown. Also shown is an additional symbol display 166 of a Rubik’s Cube device, in this case a Rubik’s Cube device 166 in the display area 148. Three faces 150, 160 and 164 of the Rubik’s Cube 166 are shown. It is preferred that when the system comprises an underlying game with virtual reels, that the majority or the entire display area (e.g., the entire CRT screen) be replaced with the image and displays associated with the bonus event. As the determination of probabilities for outcomes can be set by the programmer, correspondence in the number of possible events and positions in the display are not critical.

A game may begin and be played in the following manner. A coin, token or credit is used to wager on the play of the game. The three reels in the display panels 152, 154 and 156 begin spinning and symbols are displayed. When an predetermined event (as previously described) occurs, either of the bonus events is entered.

Figure 2:
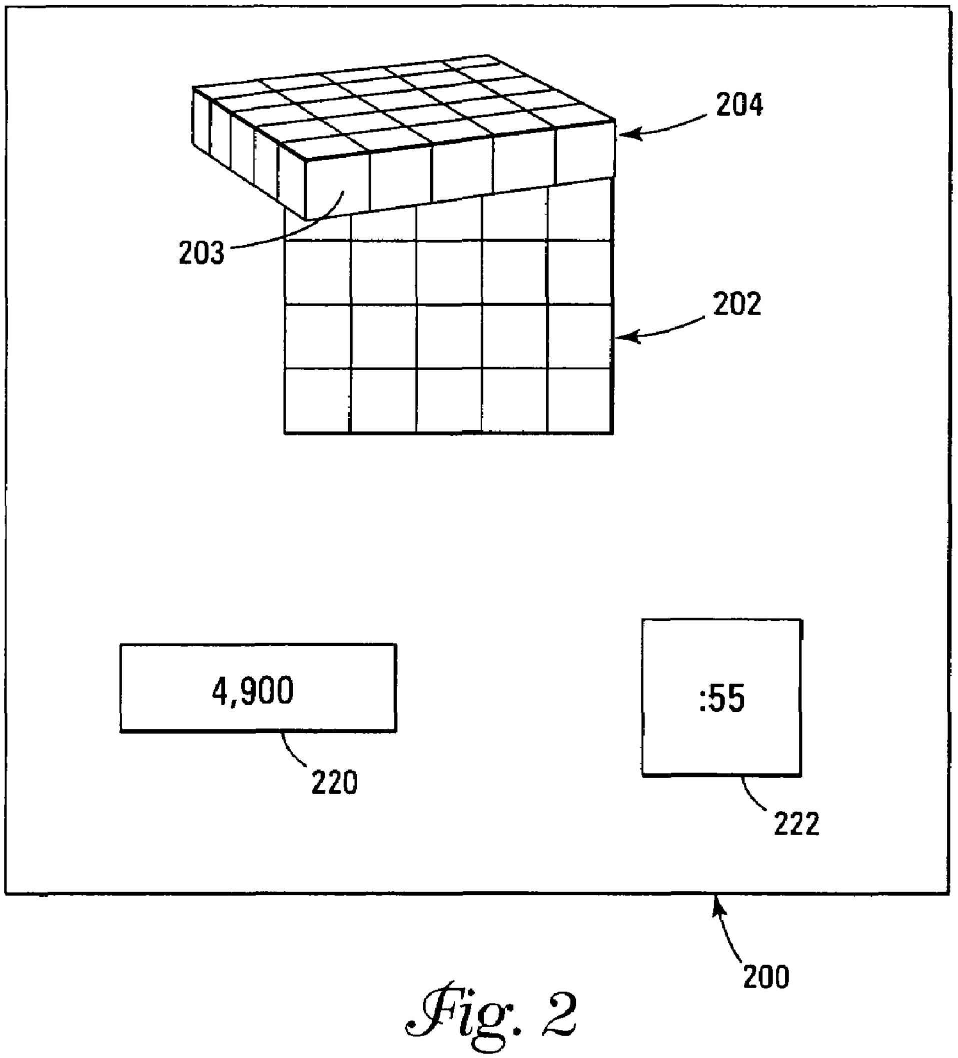
FIG. 2 shows a frontal view of a bonus event on a screen in which an animated event begins, a bonus amount is displayed and time passes during play of the animated event.

FIG. 2 shows a frontal view of a bonus event on a screen 202 in which an animated event begins, a bonus amount 220 is displayed and an indicator of time passing 222 during play is shown of the animated event. The image of the Rubik's Cube device 202 is shown with the top segment of frames 204 rotating along a plane to alter colors on frames 208.

Figure 3:
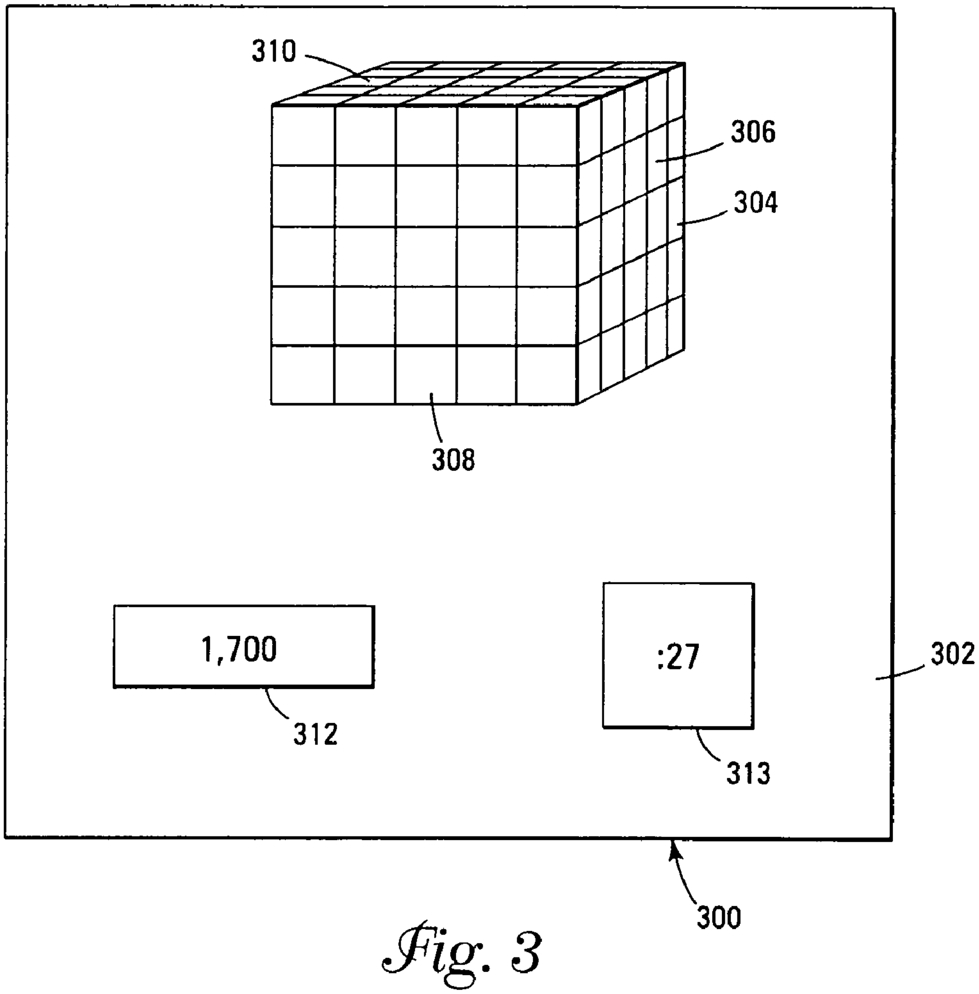
FIG. 3 shows a completed stage of an animated event and the final amount of the bonus that remains at the completion of the animated event.

FIG. 3 shows a completed stage of an animated event and the final amount of the bonus 312 that remains at the completion of the animated event. The device 300 has a display screen 302 showing a Rubik's Cube device 304. The Rubik's Cube device 304 has three distinct faces 306, 308 and 310. The gaming machine 102 as shown in FIG. 1 illustrates a standard slot-type machine with three reels that provide the underlying predetermined event to trigger at least one bonus event shown as a Rubik's Cube device. The three distinct faces 306, 308 and 310 in the completed state will have uniform colors (e.g., all green) on each face of the cube, with different colors on each face of the cube. The time passage display 313 is optional.

Figure 4:
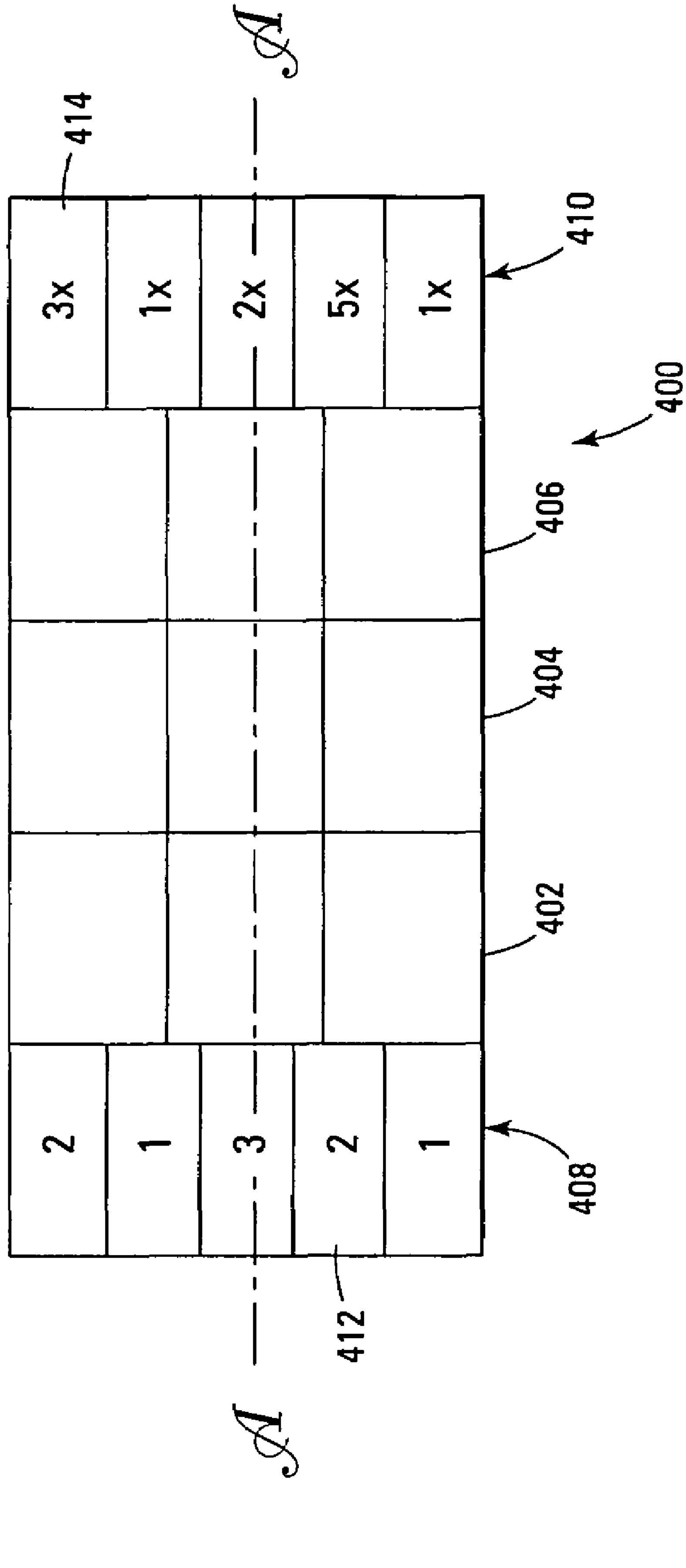
FIG. 4 shows a frontal view of a bonus event in which a first sub-event determines one element of a bonus event (e.g., a multiplier or a number of play events), with the first event at completion and then a second sub-event determines a second element of a bonus event (e.g., number of play events or a multiplier, respectively).

FIG. 4 shows a frontal view of a second or alternate bonus event. All game events are shown on a display device 400. The display device includes the three underlying game reels 402, 404 and 406. These reels would show the predetermined event (not shown) that triggers the bonus round. Column 408 shows frames 412 that display the number of bonus spins that will be awarded. Column 410 shows frames 414 where the multiplier values are shown. Either one of the columns 408 and 410 may be started first or stopped first, or used in concert. Underneath the pay line A-A is shown the selected number of spins (3) in column 408 and the selected multiplier value (2.times.) shown in column 410. In this case, the first sub-event of column 408 determines one element of a bonus event (e.g., a number of play events) with the first event (in columns 402, 404 and 406) at completion, and then a second sub-event determines a second element of a bonus event in column 410 (e.g., a multiplier).

In one example of the game, the game symbols and symbol arrangements on reel strips 402, 404 and 406 is different in the play of the base game than in the bonus round. In another example of the invention, the game symbols and symbol mapping are the same in the bonus round as the base game.

In a preferred form of the invention, all reels in the base game are used to determine base game outcomes, but fewer than all of the reels are spun to determine bonus game outcomes. The winning combinations from the base game and bonus game may be the same or different. In one example of the invention, a 3.times.5 reel display is used to evaluate the base game payouts and the first three reels, center three reels or last three reels are used to determine bonus payouts. The remaining two reels in the bonus game determine a number of bonus spins and a multiplication factor.

The format of the present game offers some significant ability to be varied in both appearance and mathematical effects. As clearly and repeatedly noted in the descriptions provided above, there are many alternatives allowed in the practice of the present invention. Many of the alternatives have been specifically described, and others are within the design and selection skill of those skilled in the art within the scope of the present invention. The generic terms used above are not to be limited by the specific examples provided, and the alternatives within the skill of the artisan are intended to be included within the generic descriptions.

The invention is claimed as follows:

1. A gaming device comprising:

at least one display device configured to display:

(i) a game operable upon a wager, and (ii) a puzzle having a plurality of movable puzzle elements repositionable relative to one another so that: (a) the puzzle has an unsolved condition at a first time in which all of the movable puzzle elements form a first spatial arrangement; and (b) the puzzle has a solved condition at a second time in which all of the movable puzzle elements form a second spatial arrangement which is different from the first spatial arrangement;

at least one input device;

at least one processor; and at least one memory device which stores a plurality of instructions, which when executed by the at least one processor, cause the at least one processor to operate with the at least one display device and the at least one input device to:

(a) display the game, and (b) after an occurrence of a designated event:

(i) randomly determine a final value;

(ii) determine an amount of time that will elapse between the first time and the second time, the amount of time based on the randomly determined final value;

(iii) display the puzzle having the unsolved condition at the first time;

(iv) indicate an initial value when or before the puzzle has the unsolved condition;

(v) cause the puzzle to proceed from the unsolved condition toward the solved condition;

(vi) in response to the determined amount of time elapsing, cause the puzzle to have the solved condition at the second time;

(vii) indicate the randomly determined final value; and (viii) indicate at least one award based on the indicated final value.

2. The gaming device of claim 1, wherein the puzzle is part of the game.

3. The gaming device of claim 1, which includes a second game, wherein: (a) the second game is triggerable following a designated event; and (b) the second game includes the puzzle.

4. The gaming device of claim 1, wherein the game includes a plurality of reels or a card game.

5. The gaming device of claim 1, wherein the puzzle has a virtual form, said puzzle being displayed by: (a) the at least one display device which indicates the initial value and the final value; or (b) another display device.

6. The gaming device of claim 1, wherein the at least one memory device includes at least one instruction, which when executed by the at least one processor, causes the at least one processor to reposition the plurality of movable puzzle elements relative to one another while the puzzle is proceeding from the unsolved condition toward the solved condition.

7. The gaming device of claim 1, wherein the puzzle includes a puzzle selected from the group consisting of a cube-shaped puzzle, a puzzle based on or including a Rubik's Cube®, a puzzle including a logical toy, a puzzle including an arrangement of a plurality of shape-related pieces, a puzzle including an arrangement of a plurality of logically-related pieces, and a puzzle including an arrangement of visual information in a designated visually-recognizable pattern.

8. The gaming device of claim 1, wherein when executed by the at least one processor, the plurality of instructions cause the at least one processor to cause the at least one display device to display an award meter, the award meter being configured to indicate the initial value, any preliminary values between the initial value and the final value, and the final value.

9. The gaming device of claim 1, wherein the initial value decreases toward the final value as the puzzle proceeds from the unsolved condition toward the solved condition.

10. The gaming device of claim 1, wherein the initial value increases toward the final value as the puzzle proceeds from the unsolved condition toward the solved condition.

11. A gaming device comprising:

at least one memory device which stores a plurality of instructions and data, the data corresponding to:
(a) a game operable upon a wager;
(b) a puzzle including a plurality of puzzle elements configured to form a designated visually-recognizable pattern, the puzzle operable to proceed from:
(i) an unsolved condition associated with an initial arrangement of all of the puzzle elements, the initial arrangement deviating from the designated visually-recognizable pattern; to
(ii) a solved condition associated with a final arrangement of all of the puzzle elements, the final arrangement satisfying the designated visually-recognizable pattern;
(c) an award meter configured to indicate a plurality of preliminary award values and a final award value;
(d) a progress meter configured to indicate a plurality of preliminary progress values and a final progress value; and
(e) at least one award based on the final award value;

at least one display device; and at least one processor which, upon execution of the instructions, operates with the at least one display device to:
(a) display the game,
(b) cause the award meter to indicate a first one of the preliminary award values when or before the puzzle has the unsolved condition,
(c) cause the progress meter to indicate a first one of the progress values when or before the puzzle has the unsolved condition,
(d) randomly determine the final award value which will subsequently be indicated by the award meter,
(e) determine the final progress value which will subsequently be indicated by the progress meter, the final progress value being based on the randomly determined final award value,
(f) cause the puzzle to proceed from the unsolved condition toward the solved condition,
(g) in response to the puzzle proceeding from the unsolved condition toward the solved condition,
(i) cause the award meter to indicate at least one other of the preliminary award values, and
(ii) cause the progress meter to indicate at least one other of the progress values,
(h) cause the progress meter to indicate the final progress value,
(i) in response to the progress meter indicating the final progress value, display the puzzle reaching the solved condition,
(j) cause the award meter to indicate the randomly determined final award value, and
(k) cause the at least one display device to indicate the at least one award based on the randomly determined final award value.

12. The gaming device of claim 11, wherein the progress meter is associated with an amount of time elapsed between a first time, at which the puzzle has the unsolved condition, and a second time, at which the puzzle reaches the solved condition, a first one of the plurality of preliminary progress values being associated with the first time, the final progress value being associated with the second time.

13. The gaming device of claim 11, wherein the progress meter is associated with a quantity of moves for the puzzle to proceed from the unsolved condition to the solved condition, a first one of the plurality of preliminary progress values being associated with an initial one of the moves which causes the puzzle to proceed from the unsolved condition toward the solved condition, the final progress value being associated with a final one of the moves which causes the nuzzle to have the solved condition.

14. The gaming device of claim 11, wherein the game includes a plurality of reels or a card game.

15. The gaming device of claim 11, wherein the puzzle has a virtual form, said puzzle being displayed by: (a) the display device which indicates the preliminary values and the final value; or (b) another display device.

16. The gaming device of claim 11, which includes a housing, wherein the puzzle has a mechanical form, and the puzzle is supported by the housing.

17. The gaming device of claim 11, wherein the puzzle includes a puzzle selected from the group consisting of a cube-shaped puzzle, a puzzle based on or including a Rubik's Cube®, a puzzle including a logical toy, a puzzle including an arrangement of a plurality of shape-related pieces, a puzzle including an arrangement of a plurality of logically-related pieces.

18. The gaming device of claim 11, wherein when executed by the at least one processor, the plurality of instructions cause the at least one processor to cause the at least one display device to display the award meter indicating at least one of the preliminary values and the final value at different points in time during the game.

19. The gaming device of claim 18, which includes an award symbol associated with each one of the preliminary values and the final value, each one of the award symbols being displayed by the award meter.

20. The gaming device of claim 19, wherein each one of the award symbols includes a numeral wherein: (a) the award meter incrementally displays the numerals associated with the preliminary values before the puzzle is solved; and (b) displays the numeral associated with the final value when or after the puzzle is solved.

21. A method for operating a gaming device having a plurality of instructions, the method comprising:
(a) initiating a play of a game after receiving a wager;
(b) determining whether a designated event occurs; and
(c) if the designated event occurs:
(i) causing at least one display device to display a puzzle, the puzzle having a plurality of movable puzzle elements positionable so that:
(a) the puzzle has an unsolved condition at a first time in which all of the movable puzzle elements form a first spatial arrangement; and
(b) the puzzle has a solved condition at a second time in which all of the movable puzzle elements form a second spatial arrangement which is different from the first spatial arrangement;
(ii) causing at least one processor to execute the plurality of instructions to randomly determine a final value;
(iii) causing the at least one processor to execute the plurality of instructions to determine an amount of time that will elapse between the first time and the second time, the amount of time based on the randomly determined final value;

(iv) causing the at least one display device to display the puzzle having the unsolved condition at a first time during the play of the game;

(v) causing the at least one display device to display an initial value when or before the puzzle has the unsolved condition;

(vi) causing the at least one processor to execute the plurality of instructions to cause the puzzle to proceed from the unsolved condition to the solved condition;

(vii) in response to the determined amount of time elapsing, causing the at least one processor to execute the plurality of instructions to cause the puzzle to have the solved condition at a second, different time during the play of the game;

(viii) causing the at least one display device to display the determined final value; and (ix) causing the at least one display device to display at least one award based on the indicated final value.

22. The method of claim 21, which includes operating the puzzle as part of the game.

23. The method of claim 21, which includes: (a) providing a second game; (b) triggering the second game after the designated event occurs, wherein the designated event is based on at least one of (i) time, (ii) a combination of symbols in the game, (iii) a number of plays of the game, and (iv) an amount won in the game; and (c) operating the puzzle as part of the second game.

24. The method of claim 21, which includes displaying the puzzle in virtual form or mechanical form.

25. The method of claim 21, wherein the puzzle is selected from the group consisting of a cube-shaped puzzle, a puzzle based on or including a Rubik's Cube®, a puzzle including a logical toy, a puzzle including an arrangement of a plurality of shape-related pieces, a puzzle including an arrangement of a plurality of logically-related pieces, and a puzzle including an arrangement of visual information in a designated visually-recognizable pattern.

26. The method of claim 21, which includes displaying an award meter, the award meter indicating the initial value and the final value.

27. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(i) display a game, the game being—operable upon a wager placed by a player, the game associated with a plurality of awards;

(ii) display an assembly associated with the game, the assembly having a plurality of assembly side areas, each one of the assembly side areas including a plurality of elements, each one of the elements having a plurality of element side areas, a first group of the elements being coupled to a second group of the elements, the first group of the elements being movable relative to the second group of the elements between:

(a) a first spatial location where the element side areas of the first and second group have a characteristic in common; and (b) a second, different spatial location where the element side areas of the first and second group have at least one different characteristic, the elements of the first group and the elements of the second group remaining coupled to each during the movement;

(iii) randomly determine whether to provide one of the awards to the player, wherein the random determination is independent from the movement of the elements of the displayed assembly; and (iv) after randomly determining whether to provide one of the awards to the player, display the first group of the elements moving relative to the second group of the elements between the first spatial location and the second, different spatial location.

28. The gaming device of claim 27, wherein the first object has a virtual form or a mechanical form.

29. The gaming device of claim 27, wherein the assembly includes a puzzle, the puzzle being selected from the group consisting of a cube-shaped puzzle, a puzzle based on or including a Rubik's Cube®, a puzzle including a logical toy, a puzzle including an arrangement of a plurality of shape-related pieces, a puzzle including an arrangement of a plurality of logically-related pieces, and a puzzle including an arrangement of visual information in a designated visually-recognizable pattern.

30. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) display a primary game operable upon a wager placed by a player;

(b) after an occurrence of a triggering event in association with the primary game:

(i) display a secondary game, the secondary game being associated with a plurality of awards;

(ii) display an assembly having a plurality of assembly side areas, each one of the assembly side areas including a plurality of elements, each one of the elements having a plurality of element side areas, a first group of the elements being coupled to a second group of the elements, the first group of elements being movable relative to the second group of the elements between:

(a) a first spatial location where the element side areas of the first and second group have a characteristic in common; and (b) a second, different spatial location where the element side areas of the first and second group have at least one different characteristic, the elements of the first and second group remaining coupled to each other during the movement;

(iii) randomly determine whether to provide one of the awards to the player, wherein the random determination is independent from the movement of the elements of the displayed assembly; and (iv) after randomly determining whether to provide one of the awards to the player, display the first group of the elements moving relative to the second group of the elements between the first spatial location and the second, different spatial location.

31. The gaming device of claim 30, wherein the first object has a virtual form or a mechanical form.

32. The gaming device of claim 30, wherein the assembly includes a puzzle, the puzzle being selected from the group consisting of a cube-shaped puzzle, a puzzle based on or including a Rubik's Cube®, a puzzle including a logical toy, a puzzle including an arrangement of a plurality of shape-related pieces, a puzzle including an arrangement of a plurality of logically-related pieces, and a puzzle including an arrangement of visual information in a designated visually-recognizable pattern.

33. The gaming device of claim 1, wherein the final value is based on a number of moves for the puzzle to proceed from the unsolved condition to the solved condition during the designated time period.

34. The gaming device of claim 33, wherein the initial value decreases toward the final award value and the number of moves increases as the puzzle proceeds from the unsolved condition toward the solved condition.

35. The gaming device of claim 33, wherein the initial value increases toward the final value and the number of moves increases as the puzzle proceeds from the unsolved condition to the solved condition.

36. The gaming device of claim 27, wherein the assembly side areas are connected together to encompass a center point such that the assembly has a substantially cubical shape.

37. The gaming device of claim 30, wherein the assembly side areas are connected together to encompass a center point such that the assembly has a substantially cubical shape.

* * * * *

UNITED STATES PATENT AND TRADEMARK OFFICE

CERTIFICATE OF CORRECTION

PATENT NO. : 7,604,539 B2
APPLICATION NO. : 11/220470
DATED : October 20, 2009
INVENTOR(S) : Hartl et al.

It is certified that error appears in the above-identified patent and that said Letters Patent is hereby corrected as shown below:

IN THE CLAIMS:

Claim 13, Column 16, line 11, replace "nuzzle" with --puzzle--.

Claim 27, Column 17, line 51, replace the "-" between the terms "being" and "operable" with a space.

Signed and Sealed this

Twentieth Day of July, 2010

David J. Kappos

David J. Kappos
*Director of the United States Patent and Trademark Office*